United States Patent
Parsons

[19]

[11] Patent Number: 5,951,388
[45] Date of Patent: Sep. 14, 1999

[54] DUST CONTROL DEVICE

[76] Inventor: David Roy Parsons, 1697 Fisher Ave., Ottawa, Ontario, Canada, K2E 1X9

[21] Appl. No.: 08/914,759

[22] Filed: Aug. 20, 1997

[30]  Foreign Application Priority Data

Aug. 22, 1996 [CA] Canada ................................... 2183903

[51] Int. Cl.⁶ .................................................... B24B 55/10
[52] U.S. Cl. ........................................... 451/451; 451/456
[58] Field of Search ................................... 451/451, 453, 451/455, 454, 353, 456

[56]  References Cited

U.S. PATENT DOCUMENTS 4,731,895  3/1988  Zack et al. ............................... 451/353
4,731,956  3/1988  Wood ....................................... 451/456

FOREIGN PATENT DOCUMENTS 1017865  11/1991  WIPO .................................... 451/456

*Primary Examiner*—Robert A. Rose
*Attorney, Agent, or Firm*—Susan D. Beaubien

[57]  ABSTRACT

The invention relates to a dust retaining and filtering device which can be attached to a dust generating tool, for controlling the spread of dust and other particulate matter generated by grinding, sanding, polishing, burnishing and buffing devices. The device comprises a resilient skirt which curves outwardly along its bottom edge; a filter extending along the length of the skirt; means for mounting the filter along the length of the skirt and attachment means for securing the device to the dust generating tool.

9 Claims, 2 Drawing Sheets

DUST CONTROL DEVICE

BACKGROUND OF THE INVENTION

This invention relates to a device for trapping and retaining dust and other particulate matter generated by tools used to grind, sand, burnish, polish and otherwise clean or treat a surface by way of abrasion. More particularly, it relates to a dust retaining and filtering device which can be attached to a dust generating tool.

Floors and other surfaces are frequently cleaned, finished or treated by grinding, sanding, polishing or burnishing operations. Such operations generate fine particulate matter or dust, which tend to be driven upwards from the surface being cleaned or treated, due to the centrifugal forces which result from the interaction of the surface being treated with the apparatus used in such operations. This creates a generally unclean work environment and can pose a health hazard to the operator of the apparatus who is exposed to breathing dust and other particulate matter so generated.

Conventionally, dust or particulate matter has been removed or controlled during grinding, sanding or burnishing operations through the use of a vacuum system which is attached to the dust generating apparatus. However, vacuum systems have a number of disadvantages. The energy cost involved in operation can lead to significant expense. The size and shape of the vacuum unit can make it cumbersome and inconvenient to attach to the dust generating apparatus.

It can also be difficult to locate a vacuum system which is compatible with the shape, configuration and operation of a particular apparatus. Retrofitting of the apparatus or use of complicated fasteners may be necessary to securely attach the vacuum to the apparatus.

Moreover, vacuum systems require ongoing, periodic maintenance and replacement of parts. Leaks in the vacuum system, which are not uncommon, result in escape of dirt and dust, thereby reducing effectiveness. Failure to conduct regular servicing of the vacuum system will ultimately result in system malfunction. Repairs on vacuum systems are costly due to the cost of their component parts and the time required for repair.

SUMMARY OF THE INVENTION

The present invention seeks to obviate and mitigate the inherent disadvantages arising from the use of vacuum systems to control or contain the spread of dirt, dust and other airborne particulate matter arising from the concurrent operation of a surface abrasion apparatus or dust producing tool, such as a grinder, sander, burnisher, polisher or buffer; by providing a device which requires no electrical power, is mechanically simple and lightweight, is straightforward to maintain and which can be easily fitted onto a variety of dust generating tools.

Preferably, such dust generating tools include floor polishing devices; floor burnishers; floor buffers; as well as grinders, sanders and other like devices which clean or treat surfaces by means of abrasion.

In one aspect, the invention provides a device for trapping particulate matter generated during operation of a surface abrasion apparatus, comprising a resilient wall member with a lower, surface engaging lip portion; a filter adjacent said wall member; retaining means for securing said filter to said wall member; and attachment means for detachably securing said wall member to said surface abrasion apparatus.

In a further aspect, the invention provides an apparatus for retaining the dust generated by a tool selected from the group comprising grinding, sanding, polishing, burnishing and buffing devices; and adapted for use in combination with said devices, comprising a flexible skirt which curves outwardly along its bottom edge; a filter extending along the length of the skirt; means for mounting the filter along the length of the skirt and attachment means for securing the apparatus to the tool.

In a further embodiment, the invention comprises a dust deflector to which is strapped a filter and a mounting strap. The dust deflector is attached to the perimeter of the dust generating tool by means of a base strap. The mounting strap releasably attaches to the base strap. The dust deflector extends from the bottom of the dust generating tool to the floor. It is flexible enough to adapt to the contour of the dust generating tool, while being rigid enough to prevent dirt or dust particles from escaping the confines of the space defined by the surface being cleaned, treated or polished, the deflector and the filter.

Preferably, the mounting and base straps are connected by either a hook and pile fastener or button snaps. The fastening means may comprise a plurality of fasteners consisting of rivets or nuts and bolts, a retaining plate and holding means consisting of a strap with a VELCRO (trade-mark) fastener or buckle wherein the fasteners secure the holding means between the skirt and the retaining plate and the holding strap secures the filter and the mounting strap.

BRIEF DESCRIPTION OF THE DRAWINGS

The construction, operation and advantages of the present invention will become apparent as it is now described in detail with reference to the appended drawings, wherein.

DESCRIPTION OF THE PREFERRED EMBODIMENT

Figure 1:
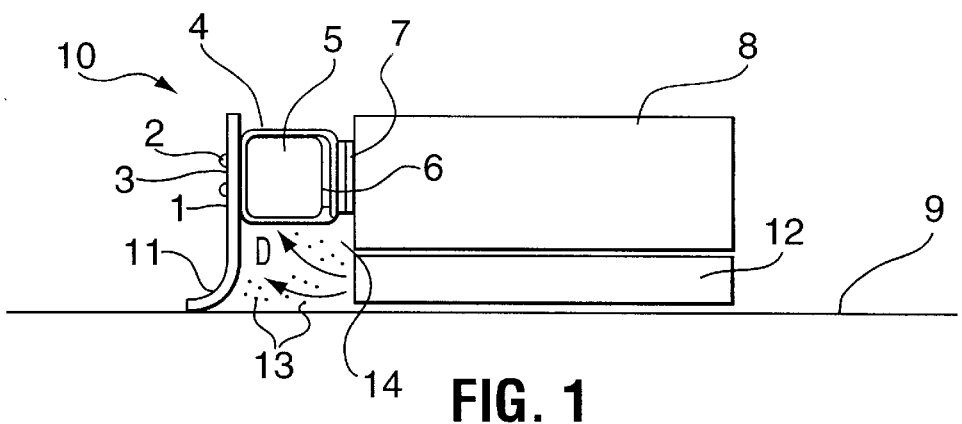
FIG. 1 is a side view of the preferred embodiment attached to a surface abrasion apparatus.

Dust control device 10 comprises a resilient wall member or housing 1, having a lower lip portion 11 which curves outwardly to meet floor surface 9. Retaining means such as fasteners 2, retaining plates 3, and holding straps 4 cooperate to retain filter 5 adjacent to wall member 1. Those skilled in the art will recognize that other mechanically equivalent fastening means may be substituted without departing from the scope of the invention.

Attachment means such as base strap 7 enable device 10 to be adapted for attachment to a surface abrasion apparatus 8 which generates dust, dirt or other particulate matter 13 during operation thereof. Apparatus 8 will typically be characterized by a rotating mechanism 12 which functions to clean or treat floor surface 9, and will perform one or more functions such as cleaning, polishing, grinding, sanding, burnishing or buffing and other like operations. Such operations create dust, dirt or other particulate matter which are driven upward and become airborne in the direction of arrow D in FIG. 1, due to the centrifugal force generated by mechanism 12.

Wall member 1 serves to trap and confine particulate matter 13 within space 14. Forward escape of particulate matter 13 is prevented by wall member 1 and lip or skirted portion 11. Particulate matter 13 is accordingly forced through filter 5 as a result of air turbulence produced by mechanism 12 and wall member 1 acting as a deflector, and is retained by filter 5. Filter 5 should be of flexible, porous material which permits air flow and yet has sufficient density to trap particulate matter. A resilient, sponge-like material, is preferred, since the pockets of the sponge will act to trap and retain particulate matter 13. Filter 5 is preferably of reticulated polyurethane foam or other similar material which has a spongy texture, and which can be readily selected by the person skilled in the art. Filter 5 optimally extends the length of wall member 1.

Figure 2:
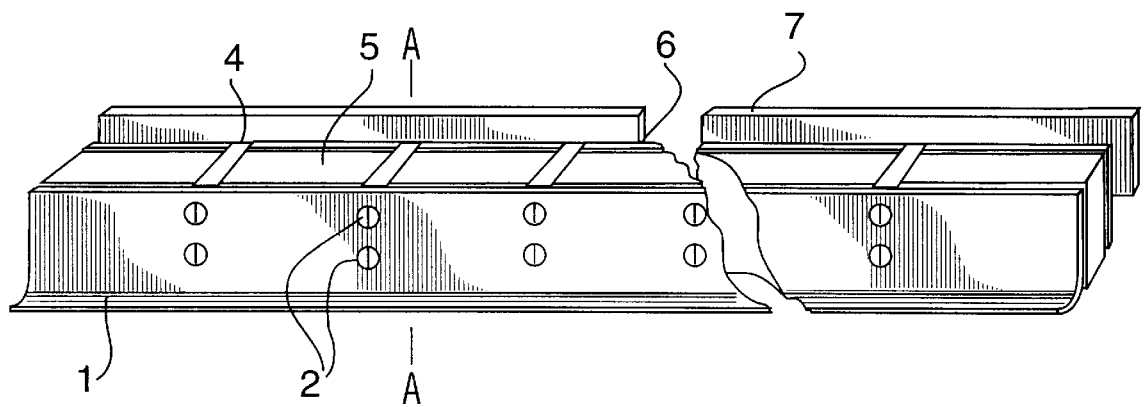
FIG. 2 is a partial perspective drawing of the preferred embodiment.
Figure 3:
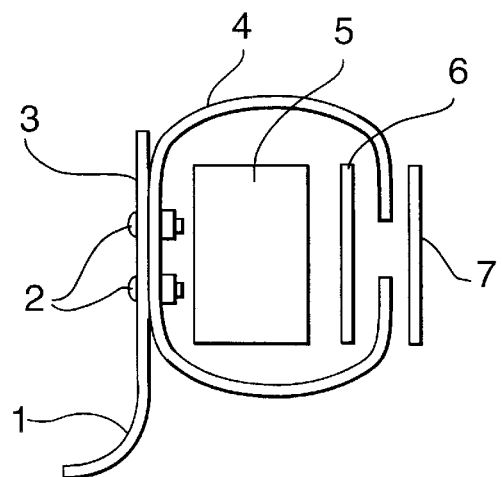
FIG. 3 is a cross-sectional view of the preferred embodiment taken about the line A—A of FIG. 2.
Figure 4:
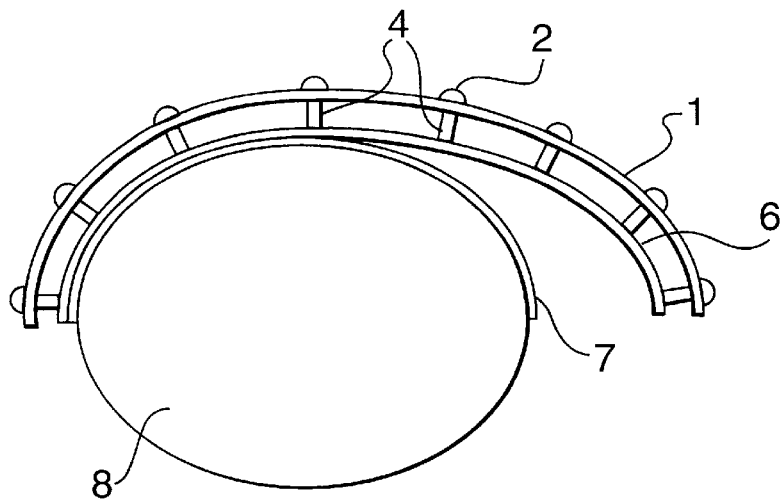
FIG. 4 is a top view of the preferred embodiment attached to a surface abrasion apparatus.
Figure 5:
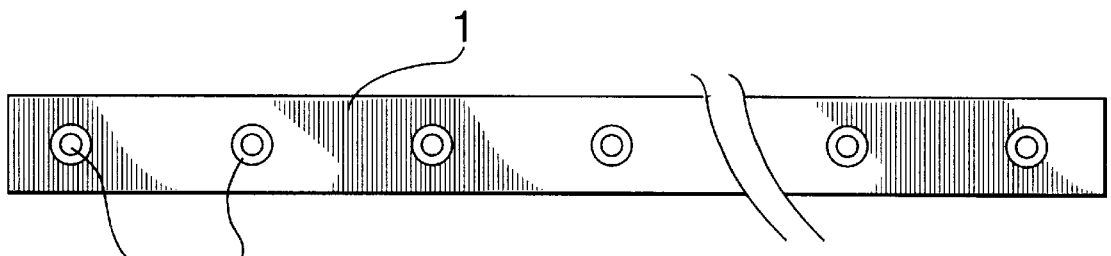
FIG. 5 is a partial side view of another preferred embodiment.
Figure 6:
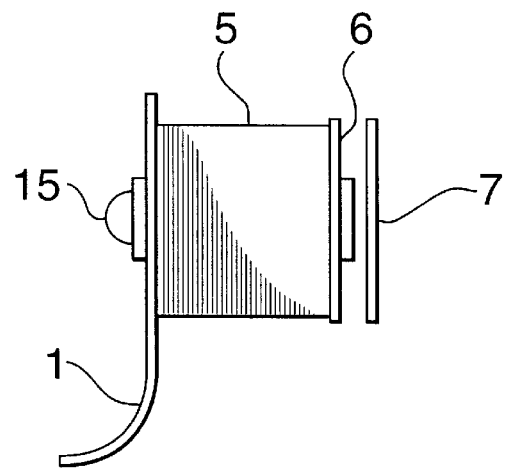
FIG. 6 is a cross-sectional view of another preferred embodiment.

It will be seen in FIG. 2 that straps 4 only partially obscure filter 5, such that air flow is not significantly impeded, there is ample surface area available for trapping and retaining particulate matter 13, and there is minimal distortion of filter 5, which may cause leakage of particulate matter 13. In an alternative embodiment, shown in FIGS. 5–6, filter 5 may be secured by use of a plurality of screw fasteners 15.

The shape of wall member 1 and the width of filter S allow clearance for the operation of mechanism 12. Wall member 1 should be sufficiently rigid to avoid buckling and provide lateral support for filter 5, yet have enough resilience to enable it to be wrapped around the circumference or perimeter of apparatus 8. A resilient plastic is preferred.

Once filter 5 becomes saturated, it may be easily cleaned or replaced by disengaging the retaining means, such as straps 4.

In the drawings, fasteners 2 are depicted as nut and bolt fasteners, but it will be evident to those skilled in the art that other suitable fasteners, such as rivets, may be used. These other fasteners are meant to be included within the body of the invention.

Holding straps 4 may be equipped with hook and pile fasteners, such as those marketed under the trade mark VELCRO but other mechanically equivalent means tie-down arrangements, such as the use of a buckle, may also be used and are meant to be included within the scope of the invention.

Attachment means for securing device 10 to apparatus 8 are depicted in the drawings as comprising a mounting strap 6 releasably attached to base strap 7, which enables device 10 to be releasably wrapped, skirt-like, around the periphery pf apparatus 8. Mounting strap 6 and base strap 7 may cooperate by means of a hook and pile or VELCRO connection. It will be understood by those skilled in the art that other connection means, such as button snaps, of sufficient binding strength to prevent separation of device 10 from apparatus 8, as a consequence of air and dust turbulence created by mechanism 12, may be used and are considered to be within the scope of the invention.

The invention eliminates the need for heavy, complex and expensive vacuum systems to be used in conjunction with dust producing equipment, for the control of airborne dust, dirt and other particulate matter generated as a result of the cleaning or treatment operations involving abrasion of the surface being cleaned or treated. The invention requires no electric power to be operable, is easily installed, is inexpensive and easy to maintain since there are no moving parts, and can be fitted for use in association with a wide variety of dust producing equipment.

The embodiments of the invention in which an exclusive privilege or property is claimed are defined as follows:

1. A device for trapping particulate matter generated during operation of a surface abrasion apparatus, comprising:

a resilient wall member with a lower, surface engaging lip portion;

a filter adjacent said wall member;

retaining means comprising a plurality of hook and pile fasteners for securing said filter to said wall member;

attachment means for detachably securing said wall member to said surface abrasion apparatus.

2. An apparatus for retaining the dust generated by a tool selected from the group comprising grinding, sanding, polishing, burnishing and buffing devices; and adapted for use in combination with said devices, comprising a flexible skirt which curves outwardly along its bottom edge; a filter extending along the length of the skirt; means for mounting the filter along the length of the skirt and attachment means for securing the apparatus to the tool.

3. A device as claimed in claim 1 wherein said surface abrasion apparatus is a dust producing tool.

4. A device as claimed in claim 1 wherein said surface abrasion apparatus is a floor sanding apparatus.

5. A device as claimed in claim 4 wherein said dust producing tool is a floor polishing apparatus.

6. A device as claimed in claim 4 wherein said dust producing tool is a floor burnishing apparatus.

7. A device as claimed in claim 4 wherein said dust producing tool is a floor buffing machine.

8. A device as claimed in claim 1 wherein said filter is of sponge-like material.

9. A device as claimed in claim 8 wherein said filter comprises reticulated polyurethane foam.

* * * * *